(12) United States Patent
Sukhomlinov et al.

(10) Patent No.: US 10,334,041 B2
(45) Date of Patent: Jun. 25, 2019

(54) NETWORK INTERFACE DEVICE FACILITATING TRANSACTION ASSURANCE

(71) Applicant: Intel Corporation, Santa Clara, CA (US)

(72) Inventors: Vadim Sukhomlinov, Santa Clara, CA (US); Kshitij A. Doshi, Chandler, AZ (US); Namakkal N. Venkatesan, Hillsboro, OR (US); Roger Keith Wiles, Corinth, TX (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 14/949,265

(22) Filed: Nov. 23, 2015

(65) Prior Publication Data

US 2017/0149884 A1    May 25, 2017

(51) Int. Cl.
| | | |
|---|---|---|
| *G06F 15/16* | (2006.01) | |
| *H04L 29/08* | (2006.01) | |
| *H04L 12/26* | (2006.01) | |
| *H04L 29/06* | (2006.01) | |

(52) U.S. Cl.
CPC .......... *H04L 67/1095* (2013.01); *H04L 43/10* (2013.01); *H04L 67/104* (2013.01); *H04L 69/24* (2013.01)

(58) Field of Classification Search
USPC .......................... 709/227, 228, 223, 224, 230
See application file for complete search history.

(56) References Cited

U.S. PATENT DOCUMENTS

| | | | | |
|---|---|---|---|---|
| 6,615,383 B1* | 9/2003 | Talluri | ................. | H04L 1/1614 |
| | | | | 714/749 |
| 9,753,797 B1* | 9/2017 | Higgins | .............. | G06F 11/0772 |
| 2001/0032254 A1* | 10/2001 | Hawkins | ............. | G06F 17/3089 |
| | | | | 709/219 |
| 2002/0152299 A1* | 10/2002 | Traversat | .............. | G06F 9/4416 |
| | | | | 709/223 |
| 2003/0120716 A1* | 6/2003 | McClellan | .............. | H04L 45/24 |
| | | | | 709/201 |

(Continued)

FOREIGN PATENT DOCUMENTS

| | | |
|---|---|---|
| KR | 1020030041631 A | 5/2003 |
| WO | WO-02077852 A1 | 10/2002 |

OTHER PUBLICATIONS

"International Application Serial No. PCT/US2016/053764, International Search Report dated Jan. 4, 2017", 3 pgs.

(Continued)

*Primary Examiner* — Lan Dai T Truong

(74) *Attorney, Agent, or Firm* — Schwegman Lundberg & Woessner, P.A.

(57) ABSTRACT

A network interface device (NID) interfaced with a host machine communicates with a local link of the host machine to obtain transaction-specific data relied upon by the host machine to be delivered to a destination by the NID according to a reliable message delivery protocol. The NID conducts communications over a network in response to obtaining of the transaction-specific data, with the network communications including execution of the reliable message delivery protocol independent of any operability of the host machine.

22 Claims, 7 Drawing Sheets

(56) References Cited

U.S. PATENT DOCUMENTS

| | | | |
|---|---|---|---|
| 2009/0083443 A1* | 3/2009 | Ocko | G06F 11/1662 |
| | | | 709/248 |
| 2009/0083445 A1* | 3/2009 | Ganga | G06F 15/16 |
| | | | 709/250 |
| 2012/0155256 A1 | 6/2012 | Pope et al. | |
| 2013/0024875 A1* | 1/2013 | Wang | G06F 9/542 |
| | | | 719/318 |
| 2013/0145072 A1* | 6/2013 | Venkataraghavan | |
| | | | H04L 67/1097 |
| | | | 710/316 |
| 2013/0198538 A1 | 8/2013 | Diab et al. | |
| 2015/0156124 A1 | 6/2015 | Tsuji | |
| 2017/0171017 A1* | 6/2017 | Licardie | H04L 41/0668 |

OTHER PUBLICATIONS

"International Application Serial No. PCT/US2016/053764, Written Opinion dated Jan. 4, 2017", 8 pgs.

* cited by examiner

NETWORK INTERFACE DEVICE FACILITATING TRANSACTION ASSURANCE

TECHNICAL FIELD

Aspects of the disclosure relate generally to information processing and communications and, more particularly, to network interface circuits (NICs) that communicate data from a host computer system over a computer network.

BACKGROUND

Today's society and economies increasingly rely on high-availability distributed computing systems and cloud computing to support high-speed transactions. Among the massive variety of information being exchanged using computer networks, transactions in particular must be handled reliably since they effect technological, or economic, or other tangible change upon which future actions and decisions will be based.

In recent years, high-speed transactions have been carried out in a number of different applications, including telecommunications (where carriers may process millions of transactions per second, such as call set-ups, handoffs, etc.), high-frequency trading of stocks or other securities (where nanosecond-scale latencies can have a substantial bearing), cloud-based online retail sales processing, audience voting systems, auctions, ticket sales, travel reservations and many others. In these kinds of applications, the requirement for reliability remains of critical importance, but speed and low-latency become equally important to stakeholders and system designers.

A practical solution is needed to enable transacting entities to conduct high-speed transactions by passing messages reliably but without having to bear the latency of conventional reliable message exchange protocols.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In data communications over networks, reliability and speed are trade-offs. To ensure reliable delivery of messages that make up a transaction, additional overhead is typically employed such as, for example, returning a verification to the sender that each message was received by the recipient. As a common example, in reliable data link and transport protocols, a sender waits for an acknowledgement from the recipient that each message segment was received. The end-to-end exchange of data and respective processing by each communicating entity to ensure reliability adds substantially to the latency of the communications of transactions. Likewise, short-cutting the reliability-assuring measures creates the risk of leaving transactions unfinished due to possible hardware failures, software bugs, malware or hacker attacks, disasters, and other sudden occurrences. Unfinished transactions can result in wrong assumptions, misunderstandings and other errors that can propagate downstream, affecting many future transactions and other entities, and are notoriously difficult from which to recover.

Figure 1:
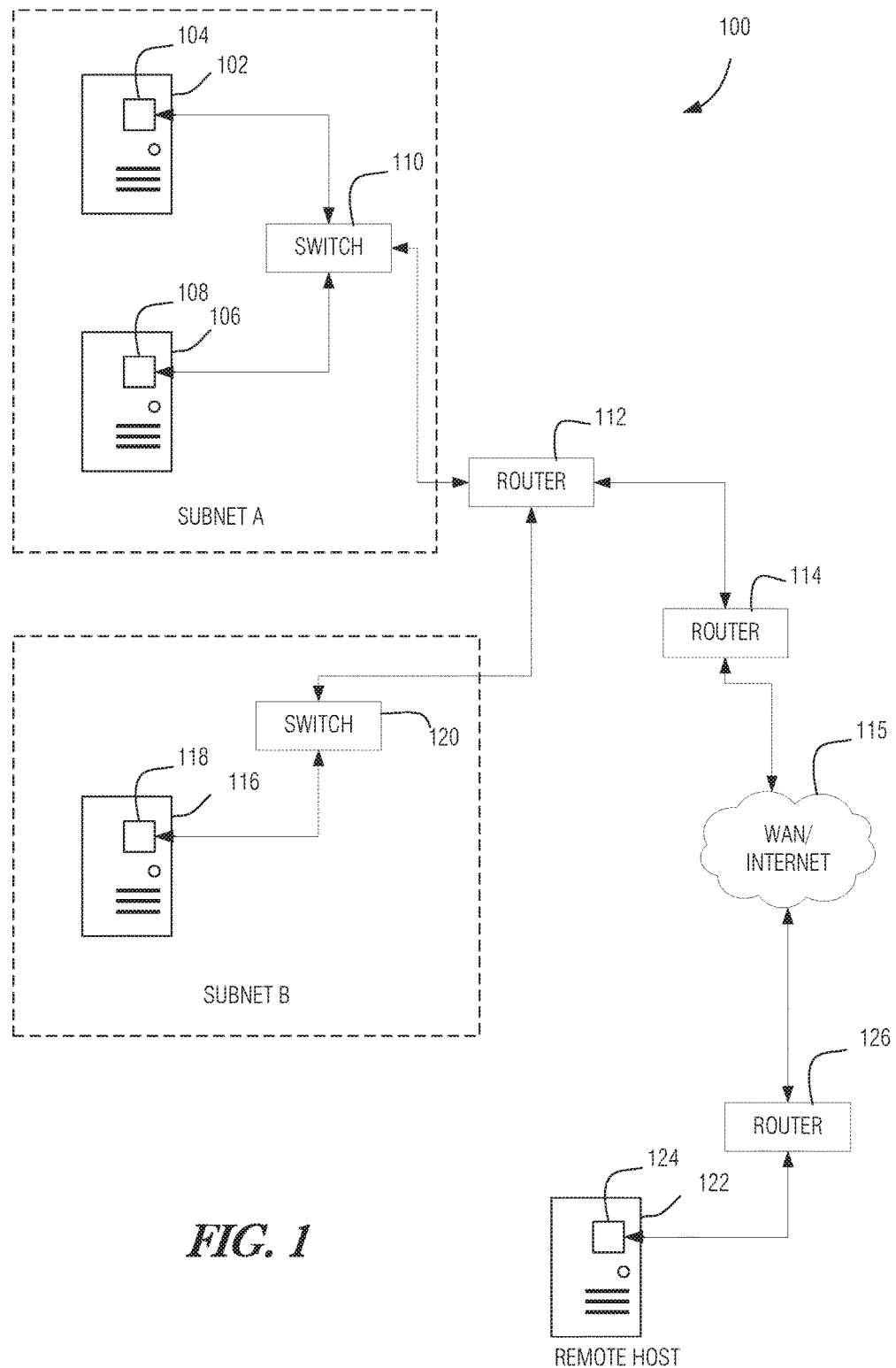
FIG. 1 is a block diagram illustrating a portion of a computer network in which aspects of the disclosure may be employed, and portions of which may constitute embodiments.

FIG. 1 is a block diagram illustrating a portion of a computer network 100 in which aspects of the disclosure may be employed, and portions of which may constitute embodiments as will be described in greater detail below. Computer network 100 includes various host machines 102, 106, 116, and 122, as depicted, that are communicatively coupled with one another via one or more transmission media. The term "transmission medium" shall be taken to include any intangible medium that is capable of storing, encoding, or carrying instructions for execution by the machine, and includes digital or analog communications signals or other intangible medium to facilitate communication of information. Examples of transmission media include copper wire, fiber optic cabling, wireless transmission channels, and the like.

An exemplary host machine's architecture is described below with reference to FIG. 2. For the sake of simplicity in the networked context illustrated in FIG. 1, each host machine 102, 106, 116, and 122 includes a network interface device (NID) 104, 108, 118, and 124, respectively. Network 100 is arranged such that host machines 102 and 106 are organized in subnet A with switch 110, and host machine 116 is part of subnet B having switch 120. Switches 110 and 120 are each coupled to local network router 112, which in turn is coupled to wide-area network router 114, which provides connectivity to wide area network 115, which may be the Internet according to one embodiment, or a proprietary wide-area network according to another embodiment. Remote host 122 is coupled to wide-area network 115 via router 126 as shown.

In one example, host machine 102, which is also referred to herein as local host machine 102, is programmed or otherwise commanded under program control, to transact with remote host 122. In the present context, a transaction includes one or more messages that, taken together, effect some change for at least local host machine 102 and remote host 122. In order for the effect of the change to be properly realized, all of the messages of the transaction must be correctly and completely communicated from the originating host machine to the target host machine. As a matter of convention for ease of discussion, unless otherwise indicated, local host machine 102 will be the originator of a transaction, while remote host machine 122 will be the target, i.e., recipient of the transaction.

It will be understood that each transaction, being composed of one or more messages, may be delivered across network 100 as segments, which may be handled as packets, which in turn may be handled as frames of bits. A hierarchical handling of the transmission may be implemented, with different processes carried out by the various nodes along the transmission path(s) on corresponding portions of the data of each transaction.

As discussed above, a transaction is contemplated as being applicable in any suitable application or endeavor—telecommunications, securities trading, auctions, consumer sales, etc. Notably, the transaction may need to be reliable, meaning the originator of the transaction—i.e., local host machine 102—may require assurance that the transaction is, or will be, received at the target—i.e., remote host 122.

In the present context, reliable message transmission is defined as a according to a protocol that assures, for the benefit of the sender, delivery of the message to the recipient, or notifies the sender of the failure or success of delivery. A reliable message delivery protocol can utilize a message transmission methodology that uses two-way communications to obtain receipt verification messaging from the intended recipient of each message indicating that the message was received.

One example of a reliable message delivery protocol is the transmission control protocol (TCP), which is a connection-oriented protocol in which acknowledgement messages are returned to the sender by the recipient upon receipt of each packet. A connection-less reliable protocol, such as AX.25, passing data in I-frames, is another example. Reliable message delivery may be accomplished in unicast or multicast messaging. Additional examples of reliable message delivery protocols are found in MIL-STD-1553B, STANAG 3910, asynchronous transfer mode (ATM), the avionics full-duplex switched ethernet (AFDX), and time triggered ethernet (TTEthernet). Also, the stream control transmission protocol (SCTP) may be used as a reliable message delivery protocol. Other data communications protocols can be utilized as well, provided there is sufficient additional information exchange to ensure reliability. For instance, a suitably-modified user datagram protocol (UDP) and remote direct memory access (RDMA) protocol may be utilized. In other examples, a reliable message delivery protocol in which delivery of messages is assured may be provided by the network fabric, obviating the need for acknowledgement messaging. Within the context of the embodiments described herein, any suitable reliable message delivery protocol, whether presently known, or arising in the future, is contemplated.

Also, notably, the transaction may need to have a low latency, meaning that local host machine 102, in the interest of high-speed performance, may need assurance of the completion of the reliable transaction within a time duration that is shorter than the end-to-end transmission and communication processing time needed to deliver the transaction to remote host 122, and receive acknowledgement of that receipt at local host machine 102. According to an embodiment, local host machine 102 completes such low-latency transactions. In a related embodiment, local host machine 102 completes low-latency transactions in a time less than the time to achieve one-way end-to-end transmission of the transaction to remote host 122.

According to one aspect of the disclosure, some embodiments of which are detailed in the following description, low-latency transactions are achievable for local host machine 102 based on transaction transmission reliability being assured by NID 104. In a related aspect, same-subnet NID 108 also provides assurance of transaction transmission reliability for the benefit of local host machine 102. In a further aspect of the disclosure, different-subnet NID 118 also participates in providing assurance of reliability for the transmission of transactions originating at local host machine 102.

Figure 2:
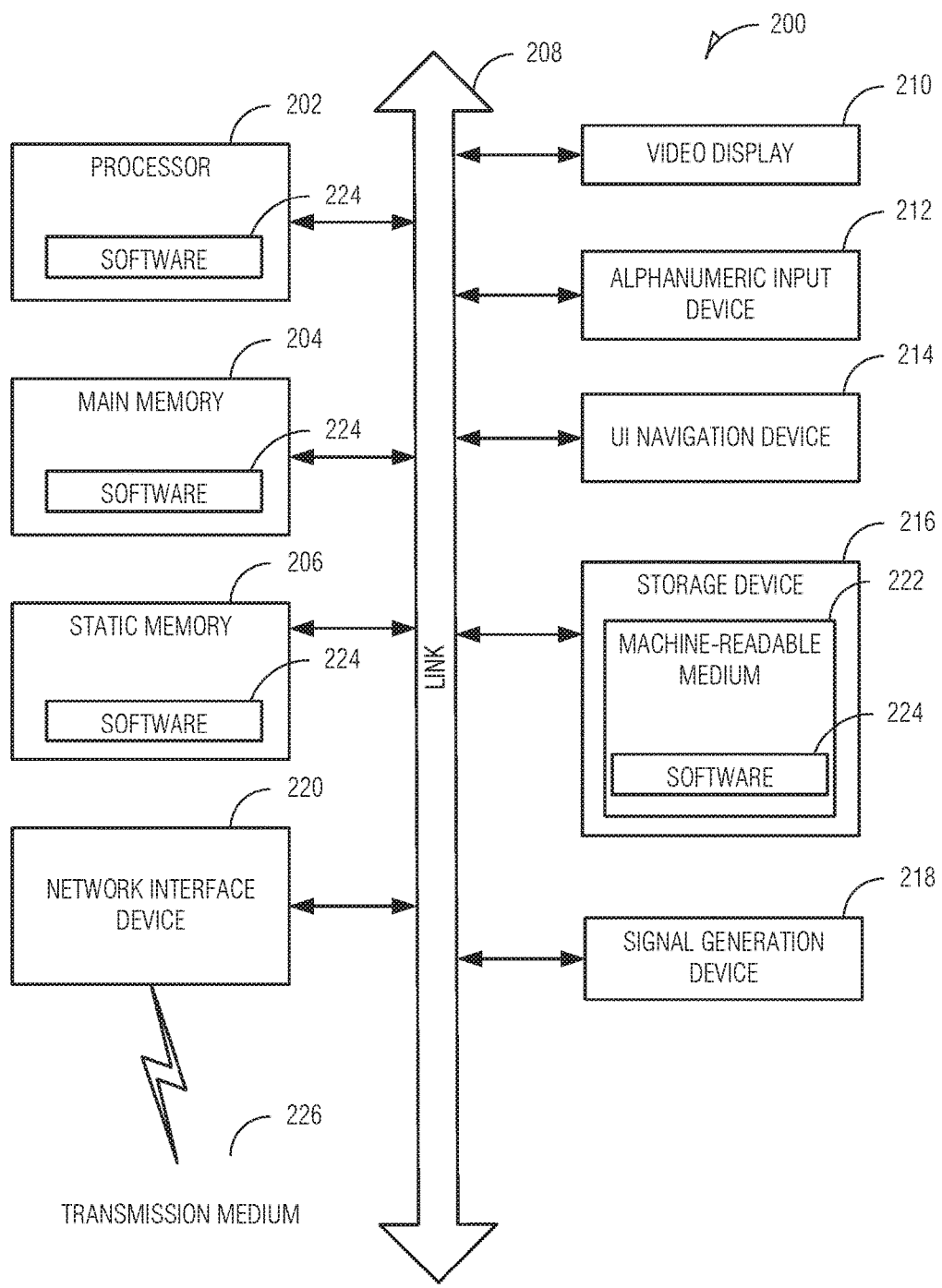
FIG. 2 is a block diagram illustrating a host machine with a network interface device according to embodiments.

FIG. 2 is a block diagram illustrating a host machine in the example form of a general-purpose computer system 200. In certain embodiments, programming of the computer system 200 according to one or more particular algorithms produces a special-purpose machine upon execution of that programming In a networked deployment, the host machine may operate in the capacity of either a server or a client machine in server-client network environments, or it may act as a peer machine in peer-to-peer (or distributed) network environments. The host machine may take any suitable form factor, such as a personal computer (PC) workstation, a server, whether rack-mounted, or stand-alone, a mainframe computer, a cluster computing system, or the like, a set-top box, as well as a mobile or portable computing system, such as a laptop/notebook PC, an onboard vehicle system, wearable device, a tablet PC, a hybrid tablet, a personal digital assistant (PDA), a mobile telephone or, more generally, any machine capable of executing instructions (sequential or otherwise) that specify actions to be taken by that machine.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a local link 208 (e.g., bus). The host machine 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The host machine 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the host machine 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port.

Figure 3:
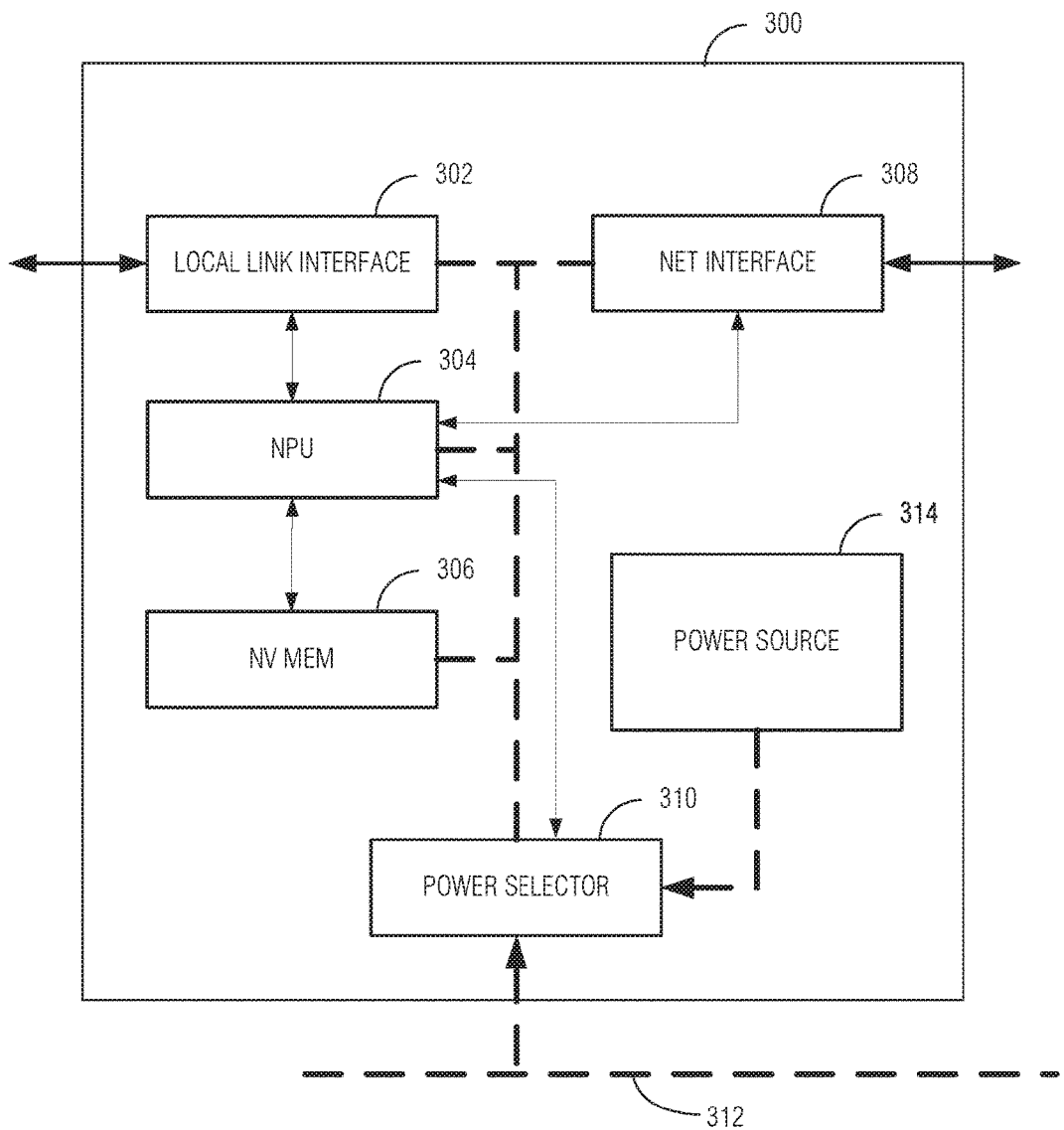
FIG. 3 is a block diagram illustrating an exemplary architecture of a network interface device according to aspects of the disclosure.

FIG. 3 is a block diagram illustrating an exemplary network interface device (NID) 300 according to an embodiment. NID 300 includes local link interface circuit 302 that communicatively couples to local link 208 of host machine 200. In one example, local link interface circuit 302 connects to a Quickpath Interconnect (QPI) of a PC as the host machine. In another example, the local link interface circuit 302 connects to a peripheral component interconnect express (PCIe) bus of a PC as the host machine. The interface of local link interface circuit 302 includes the hardware having electrical parameters to comply with the applicable local link signaling requirements, along with data buffering and encoding/decoding logic, as needed for an operational implementation. In a related embodiment, local link interface circuit 302, facilitates direct-memory access (DMA) of portions of memory 204 of the host machine that allows reading and writing of data from/to the host machine's memory without requiring any processing or input/output operations by processor 202 of the host machine.

In a related embodiment, local link interface circuit 302 is operated as part of a single-root input/output virtualization (SR-IOV) architecture implemented by the host machine, in which physical function (PF) access to resources of NID 300 is provided to a hypervisor or a management operating system of the host machine, and virtual function (VF) access is established for one or more guest operating systems running on the host machine. Each VF is a virtualized instance of the NID 300, with each VF having its own PCI Configuration space. Each VF also shares one or more physical resources on the NID 300, such as the network interface circuit 308, with the PF and other VFs.

NID processing unit NPU 304 is a processor circuit that coordinates operation of the various components of NID 300. In an embodiment, NPU 304 reads and executes instructions stored in non-volatile memory circuit 306 to implement a plurality of engines, as will be described below.

The term "engine" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which engines are temporarily configured, an engine need not be instantiated at any one moment in time. For example, where the engines comprise a general-purpose hardware processor configured using software, the general-purpose hardware processor may be configured as respective different engines at different times. Software may accordingly configure a hardware processor, for example, to constitute a particular engine at one instance of time and to constitute a different engine at a different instance of time. The term "application," or variants thereof, is used expansively herein to include routines, program engines, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

In a related embodiment, non-volatile memory 306 includes a secure storage space for storing cryptographic keys, which NPU 304 may utilize under program control to encode and decode data being transmitted or received over the network.

In a related embodiment, non-volatile memory 306 also includes a storage space that is dedicated for storing transaction information and, where applicable, log entries and control registry values. In one example, this portion of non-volatile memory 306 is accessible to the host's address space. This can be accomplished in an embodiment via virtual memory remapping or other suitable technique.

Network interface circuit 308 contains the data buffer and line driver, and receiver circuitry for sending and receiving signaling to and from the transmission medium. In a related embodiment, network interface circuit 308 includes more than one port, permitting NID 300 to communicate simultaneously along two different transmission paths, or along a main and a backup path, depending on how the multiple ports are utilized in the network.

Power selector circuit 310 supports a backup-power feature of NID 300 according to a type of embodiment. Power selector circuit 310 selects a power source from among host-provided power 312, or backup power source 314. In one embodiment, backup power source 314 includes a battery a power regulating circuit, and a charging circuit. In other embodiments, the power source is in the form of a supercapacitor device. In another embodiment, the power source may be externally-situated, such as a secondary redundant power supply from the host machine, or an uninterruptible power supply appliance. Power selector circuit 310 detects a failure of the primary power source, and in response switches over to the secondary power source to ensure operability of NID 300 in the event of a power supply-related failure of the host machine.

Figure 4:
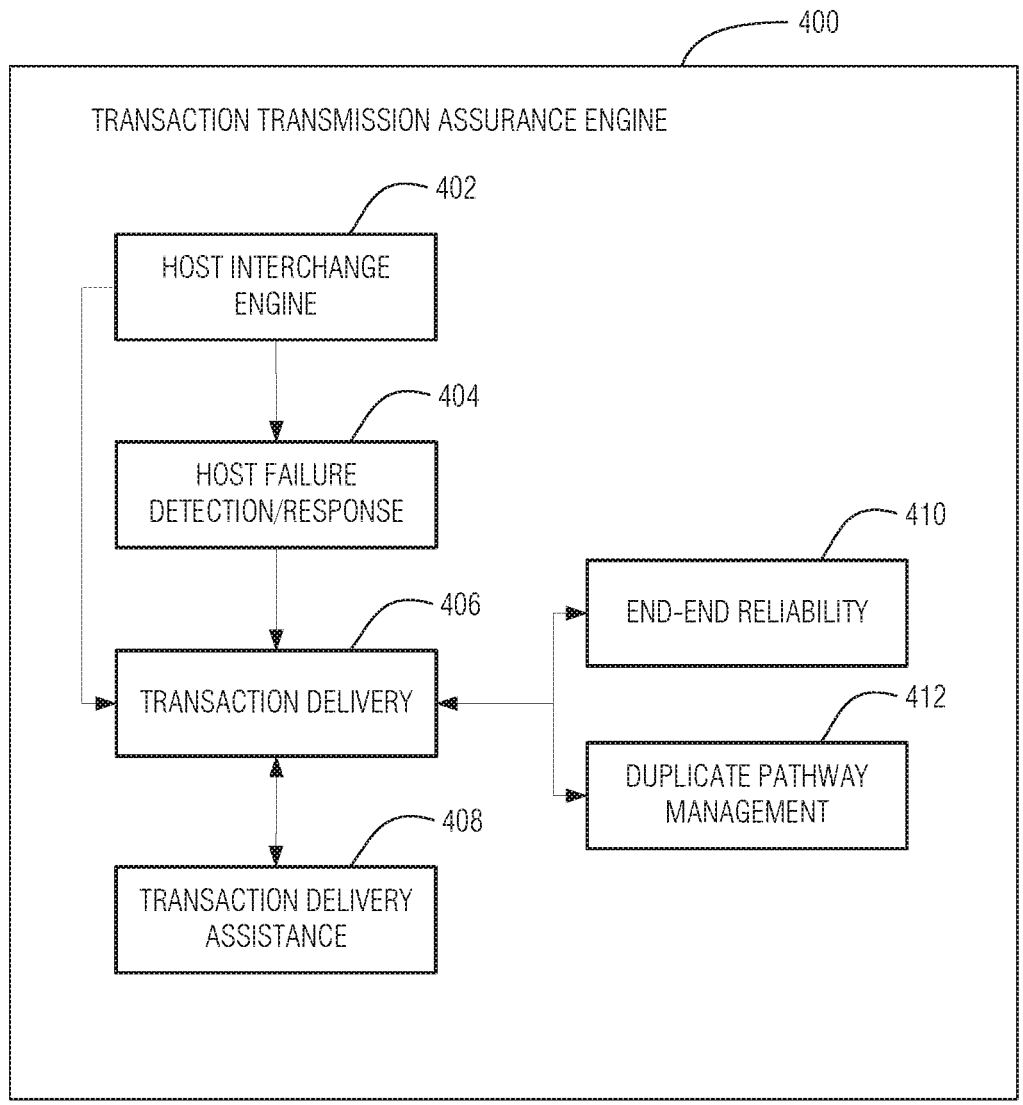
FIG. 4 is a block diagram illustrating a transaction transmission assurance engine according to an embodiment that may be implemented in the network interface device of FIG. 3.

FIG. 4 is a block diagram illustrating a transaction transmission assurance engine (TTAM) 400, which is implemented by NID 300 according to various embodiments. TTAM 400 allows the host machine to commit transaction messages to the NID 300, and effectively assume that NID 300 will ensure that the transaction messages get delivered to the intended destination at the remote host, without further involvement by the host machine. According to various embodiments, TTAM 400 further supports an operational paradigm that allows the host machine to commit a transaction with minimal processing cycles, thereby enabling the host machine to complete each transaction and move on to conduct other activity in approximately the time it takes for the host machine to write data to memory.

In a related embodiment, NID 300 supports conventional operability as would be the regime with a network interface device lacking TTAM 400. Accordingly, TTAM 400 may operate under program control in parallel with the conventional operability of NID 300. According to the embodiment depicted, TTAM 400 includes several components to implement its functionality.

Host interchange application programming interface (API) engine 402 conducts communications with the network interface driver of the host machine. In one embodiment, the following commands are facilitated via the API:

Initialize NID-brokered transaction functionality;
Start NID-brokered transaction;
End NID-brokered transaction;
Check NID-brokered transaction status.

Accordingly, host interchange API engine 402 operates to detect, among the data sent to NID 300 from the local host machine, instances where the assured-delivery functionality is to be utilized in lieu of conventional network interface operation.

Host failure detection and response engine 404 monitors for the occurrence of one or more conditions that indicate a problem with the local host machine, and takes special action in response to such events. In one embodiment, the local host machine supplies a periodic heartbeat signal via the host interchange API 402, via a control register setting in the non-volatile memory 306 of NID 300 mapped to the memory space of the local host machine using a write-to-memory operation, or using another suitable mechanism. In a related embodiment, the heartbeat signal is an n-bit counter (with n being a positive integer) that is periodically incremented. In another related embodiment, the heartbeat signal is implemented as a watchdog timer reset, with the watchdog timer being implemented by the NID 300 and the reset signal being supplied by the local host machine.

In various embodiments, the heartbeat signal can be provided by the NID driver of the host machine, or by the applications themselves. In the latter case, reliability is improved since application-level heartbeat signaling is able to identify if the application fails (e.g., due to a software bug) while the operating system and underlying hardware of the host machine continue stable operation. The former case, utilizing lower-level supplied heartbeat signaling, may be advantageous in cases where it is undesirable to burden the application developer with supporting the heartbeat functionality.

In response to a detected host failure, host failure detection and response engine 404 directs the transaction delivery engine 406 to take further actions to further increase the reliability of transaction message delivery, such as pushing out requests to one or more peer host devices to conduct transaction transmission assurance operations in support of the NID 300.

In the absence of a host failure condition, transaction delivery engine 406 operates as a message communication broker on behalf of the local host machine. In an embodiment, transaction delivery engine 406 directs the operation of end-to-end reliability engine 410 to carry out a reliable message delivery protocol to the destination remote host machine as local host machine normally would conventionally.

In implementing an end-to-end reliable message delivery protocol according to certain embodiments, end-to-end reliability engine 410 allows NID 300 to act in one sense as if it were local host 102, and not merely as an intermediary thereof, which means that once local host 102 has communicated one or more messages to NID 300, local host 102) can hand over the responsibility of completing the end-to-end message delivery to NID 300 instead of waiting for the remote host 122 to respond to local host 102 upon receipt of each message.

Duplicate pathway management engine 412 is programmed, or otherwise configured, to establish connections with compatible NIDs of one or more peer host machines, and establish backup-pathway transaction message transmission. In one embodiment, duplicate pathways are utilized as a matter of course. In an example of this embodiment, the duplicate pathways may be configured using a second port, if available, on the NID 300. Also, in another related embodiment, the duplicate pathways utilize a relatively higher-latency connection or protocol so as not to burden the network with fault-recovery supportive traffic in the absence of a fault.

In another type of embodiment, duplicate pathways are established only in response to a fault condition. According to this embodiment, in response to a detected host failure of the local host machine, duplicate pathway management engine "steps into" the role of a host machine in a sense, and recruits one or more other NIDs of peer host machines to perform brokered, reliable message transmission of all open transactions in its message queue, provided those transactions have been fully committed.

With reference to FIG. 1, NID 104 may recruit NID 108 to perform reliable transaction message delivery for messages originated by local host machine 102 and committed to NID 104. In similar fashion, NID 104 may recruit NID 118 of host machine 116 in a different subnet to perform reliable transaction message delivery for messages originated by local host machine 102 and committed to NID 104. In a related embodiment both participating NIDs, 108, and 118, are utilized concurrently for duplicated brokering of message transmission to remote host 122.

Referring again to FIG. 4, transaction delivery assistance engine 408 is responsible for assisting a peer NID with its replicated transaction message transmission requests. In one embodiment, transaction delivery assistance engine 408 is passed control messages received from peer devices. Such control messages can contain transaction information, including data payload, sender/recipient information, write-ahead log updates, and urgency indication information. In response to receiving a control message, transaction delivery assistance engine 408 directs transaction delivery engine 406 to take suitable action. For instance, end-to-end reliability engine 410 may be called upon to complete and verify message transmission to the destination host machine, with confirmation of the verified message delivery being returned to the requesting peer device.

Depending on the nature of the control message, further replication by TTAM 400 of reliable transmissions on behalf of peer devices may or may not be called for. In one embodiment, replication of a peer-requested message delivery by TTAM 400 is called for when the requesting peer device is associated with a host machine that has failed. Otherwise, if the requesting peer device is more than one replicated hop away from NID 300, then it may be assumed that sufficient replication has been handled upstream.

Figure 5:
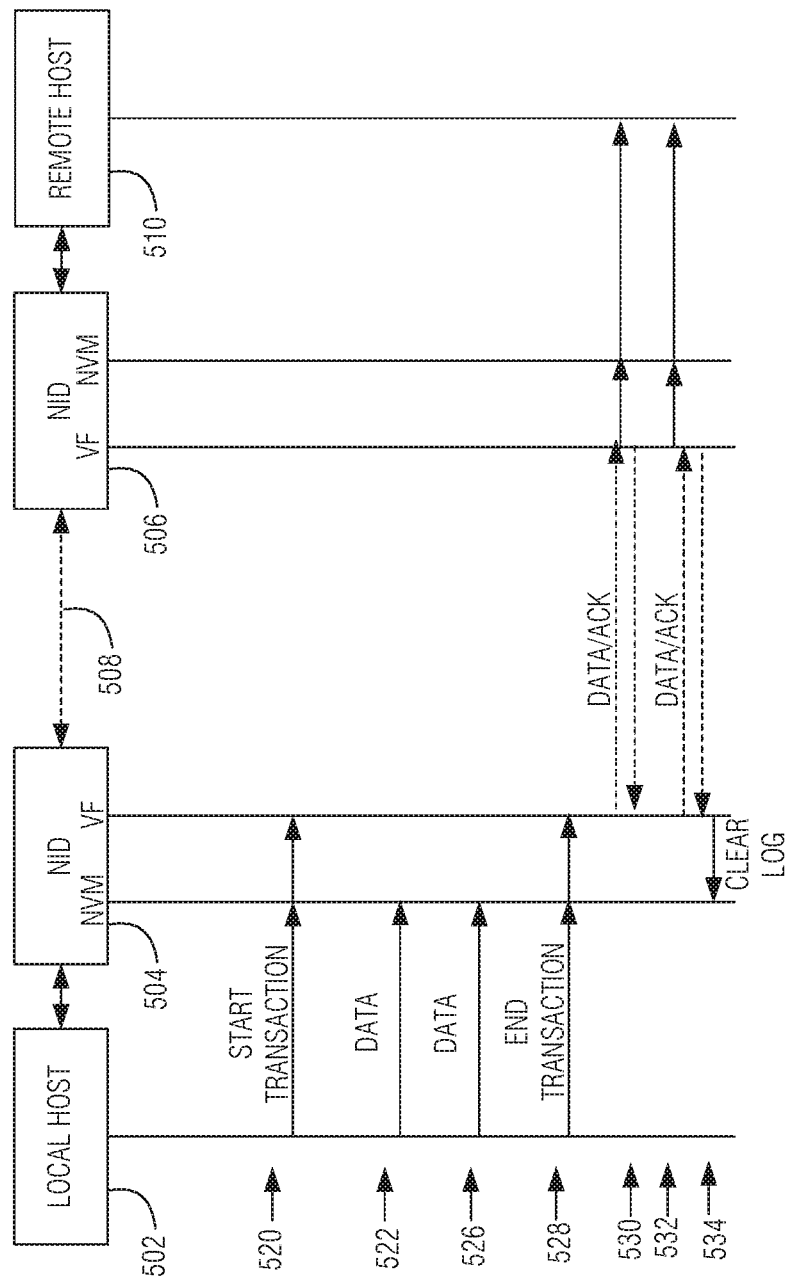
FIGS. 5-7 are data flow diagrams illustrating exemplary operation of a computer network utilizing certain aspects of the disclosure, including network interface devices and host machines communicating transactional data over a network.
Figure 6:
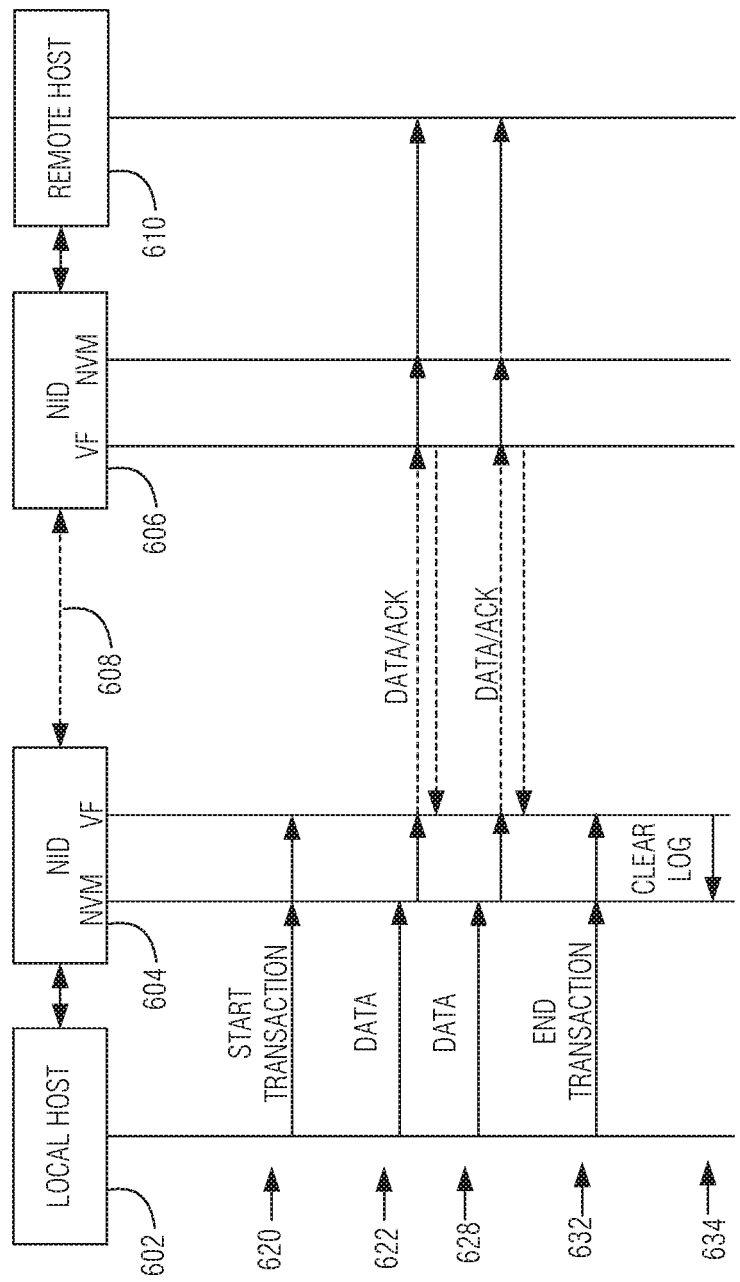
Figure 7:
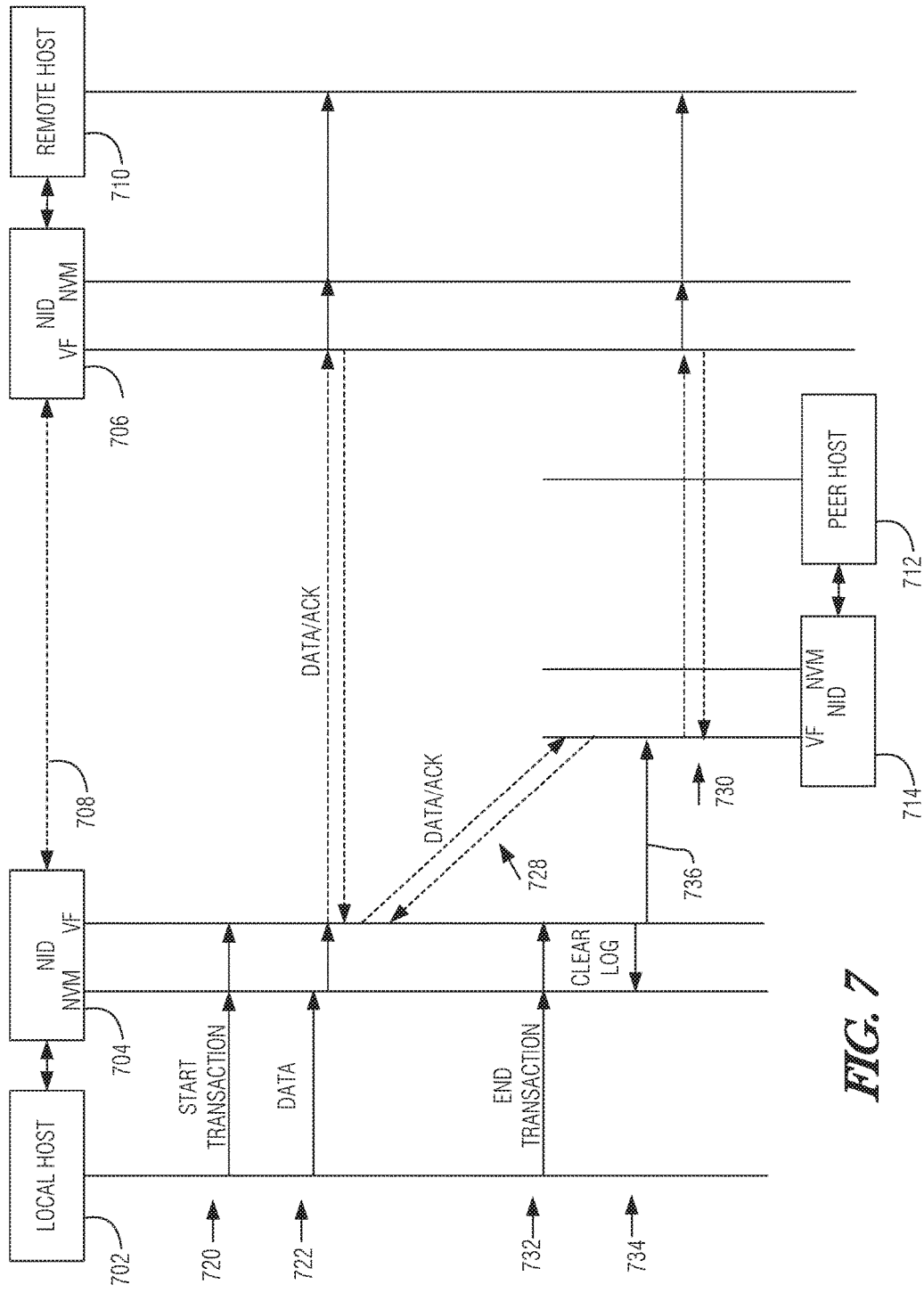

FIGS. 5-7 are data flow diagrams illustrating the operation of a network utilizing certain aspects of the disclosure. In FIG. 5, local host 502 is configured with NID 504. As depicted in this example, an SR-IOV model is utilized for the local link. Accordingly, NID 504 offers non-volatile memory NVM mapped to local host 502 and executes virtual function VF. NID 504 is communicatively coupled to remote NID 506 over a network 508, the remote NID 506 being interfaced with remote host 510.

At 520, using an established API, for interfacing with NID 504, local host 502 initiates the start of a transaction that is to be brokered by NID 504. At 522 and 526 local host 502 transfers transaction-specific data to the non-volatile memory of NID 504, which may be mapped to the magical memory space of local host 502. At 528, the local host 502 signals the end of the transaction. In response, the VF of NID 504 proceeds to reliably transmit the transaction to the destination. At 530 and 532 each portion of the transaction, i.e., messages, packets, etc., are reliably transmitted, with acknowledgement, error correction, etc. Optionally, the data may be further encrypted by the VF of NID 504 and decrypted by the VF of NID 506. At the conclusion of the transmission, the VF of NID 504 clears its write-ahead log indicating the successful conclusion of the transaction. If for some reason the transmission could not be completed, the un-cleared write-ahead log could be used by a recovery process to complete the transaction. In a related embodiment, the replication functionality incorporates an error-recovery algorithm in which the un-cleared log(s) of a failing peer NID are used to complete transmission of the failed or incomplete transaction. In certain embodiments, from the standpoint of local host 502, the transaction may be deemed completed at 528, even though remote host 510 receives and acknowledges the last data from the transaction at 534.

FIG. 6 is a similar arrangement in which local host and local NID 602 and 604, as well as remote NID, network, and remote host 606, 608, and 610 are analogous to components of FIG. 5 indicated with reference numerals 502-510. According to the process depicted in FIG. 6, NID 604 operates in a low-latency mode to support high-speed transactions. In response to a transaction start signaled by local host 602 at 620, NID 604 reads the data written to its non-volatile memory at 622, and immediately proceeds to transmit the data reliably to the recipient using a reliable transport mechanism with acknowledgements, etc. Similarly, in response to the second portion of the transaction-specific data, reliable transmission is effected at 628. Notably, in this operating mode, NID 604 does not wait for the end of transaction signal before transferring the data. In the event of a failure of local host machine 602 before the end of transaction indicator is given at 632, NID 604 may, in one embodiment, supply a control message to the recipient indicating an incomplete transaction. Depending on the error recovery configuration utilized by the remote host 610, the partially-received transaction may be deleted, or kept for some time in case the originating local host 602 is able to recover and continue the transaction. The write-ahead logging functionality may be utilized to facilitate error recovery. Only upon successful completion of the transaction as indicated by local host 602, is the log finally cleared by NID 604.

In the operation depicted in FIG. 7, transaction-specific data is communicated from local host machine 702 to remote host machine 710, each respectively configured with NID 704 and 706, and networked via network 708. In addition there is automatic replication of transaction transmission through a peer NID 714, which is locally interfaced with peer host 712. At 720, local host initiates a transaction to be transmitted. In response, NID 704 reads the transaction-specific data written at 722, and reliably transmits the transaction-specific data to NID 706. In addition to the transmission of the transaction-specific data to the intended destination at remote host 710, a replicated transaction is transmitted over link 728 to NID 714. NID 714, in turn, reliably transmits the data to remote NID 706, as indicated at 730. In a related embodiment, since duplicate transactions may be received by remote host 710, a unique ID for each transaction may be assigned and incorporated into the transaction-specific data being communicated. Accordingly, the recipient, remote host 710, may readily detect, and ignore, duplicates. Notably, in this embodiment, the receipt and forwarding of the replicated transactional data is performed by the VF of NID 714, without the involvement of peer host 712.

In a related embodiment, transaction-specific data is replicated to remote peer NID 714 as indicated at 728, except that peer NID 714 does not automatically forward the transaction-specific data to the intended destination. Instead, the transaction delivery assistance engine of NID 714 awaits an indication of the success or failure of the transaction transmission from local NID 704. If the transmission at 722 to NID 706 is successful, NID 704 instructs peer NID 714 to clear its stored transaction-specific data. In the event of a failure, NID 704 may instruct NID 714 to effect the transmission of the transaction. In a related embodiment, NID 714 is programmed, or otherwise configured, to automatically transmit the held transaction-specific data after a predefined passage of time.

In another related embodiment, the sending or non-sending of the stored transaction-specific data by peer NID 714 depends on whether NID 704 is certain that the transaction is concluded. Accordingly, NID 704 may await the end of transaction indication at 732 before instructing NID 714 at 736 to clear the stored transaction-specific data, or to send the transaction-specific data.

In a related embodiment, each NID operates in a regime where transaction-specific data is automatically replicated to peer NIDs and, in addition, there are high-latency redundant paths to peer devices that are utilized only in the event of a host machine failure. Under normal operation, the host machine writes a series of intent logs and updates into memory, which are then queued for asynchronous transmission to one or more designated peers for replication. In addition, the host machine also writes a write-ahead log of the transactional updates along with a unique monotonic sequence number to the non-volatile memory of the NID. Advantageously, in this embodiment, the act of writing to the NID's memory effectively implies committing a transaction for transmission. This avoids requiring the host machine to perform any network send operations or any kernel I/O calls.

Upon receiving acknowledgements, the host machine advances a pointer in the NID's memory to prune the write-ahead log of transactions that are complete.

In response to a host machine error, the NID uses its established backup replication path to write the written and un-pruned data through the background path. This data may propagate through multiple hops along the background path.

As described above, in an example embodiment, transaction-specific data replication, such as replication along primary and background paths, can ensure fail-safe operation even if a NID fails.

In another approach, instead of pushing transaction-specific data out to multiple peers, a centralized data store that contains transaction-specific data is shared among multiple NIDs. In the event of a NID failure, a pre-designated backup NID takes over the assured transmission responsibilities. One contemplated arrangement according to an embodiment utilizing this approach is having a plurality of NID's laid out on a motherboard on which a host machine's memory is also laid out, and providing facilities for each NID's interface to directly access the host machine's memory.

ADDITIONAL NOTES & EXAMPLES

Example 1 is a network interface device (NID), comprising: a local link interface to interface with a local link of a host machine, a network interface to transmit and receive data over a transmission medium that forms a portion of a computer network; and a processor to implement: a host interchange engine that obtains, via the local link interface circuit, transaction-specific data relied upon by the host machine to be delivered to a destination by the NID according to a reliable message delivery protocol; and a transaction delivery engine that conducts network communications via the network interface in response to obtaining of the transaction-specific data, the network communications including execution of the reliable message delivery protocol independent of any operability of the host machine.

In Example 2, the subject matter of Example 1 optionally includes, wherein the reliable message delivery protocol includes receipt verification messaging.

In Example 3, the subject matter of any one or more of Examples 1-2 optionally include, further comprising a non-volatile memory that is accessible to memory addressing of the host machine, wherein the host machine is operative to write to the non-volatile memory via a memory write operation.

In Example 4, the subject matter of any one or more of Examples 1-3 optionally include, wherein the transaction delivery engine is to cause the NID to broker reliable communications of the transaction-specific data while the host machine is inoperative.

In Example 5, the subject matter of any one or more of Examples 1-4 optionally include, wherein the transaction delivery engine is operative to implement a protocol in achieving the reliable message delivery protocol independently of any exchange of data with the host machine.

In Example 6, the subject matter of any one or more of Examples 1-5 optionally include, wherein the host interchange engine is operative to detect a start and an end of a transaction as indicated by the host machine in the transaction-specific data.

In Example 7, the subject matter of any one or more of Examples 1-6 optionally include, wherein the host interchange engine provides an application programming interface in response to obtaining of the transaction-specific data, the network communications including execution of the reliable message delivery protocol independent of any operability of the host machine operative to respond to a predefined set of commands passed to the NID from the host machine.

In Example 8, the subject matter of any one or more of Examples 1-7 optionally include, wherein the host interchange engine and the transaction delivery engine are operative to assure delivery of the transaction-specific data to the destination in response to commitment of the transaction-specific data by the host machine into a memory of the NID.

In Example 9, the subject matter of any one or more of Examples 1-8 optionally include, wherein the NID is further operative to execute data communications independent of the transaction delivery engine.

In Example 10, the subject matter of any one or more of Examples 1-9 optionally include, wherein the processor is to implement: a host failure detection and response engine that is operative to detect an error in operability of the host machine, and to adjust operability of the transaction delivery engine in response to the error detection.

In Example 11, the subject matter of Example 10 optionally includes, wherein the operability of the transaction delivery engine is adjusted to replicate the transaction-specific data to at least one peer NID.

In Example 12, the subject matter of any one or more of Examples 10-11 optionally include, wherein the host failure and response engine includes a heartbeat monitor that obtains a heartbeat signal from the host machine and that is operative to indicate a host machine failure in response to a disturbance of the heartbeat signal.

In Example 13, the subject matter of Example 12 optionally includes, wherein the heartbeat signal is provided by an application running on the host machine.

In Example 14, the subject matter of any one or more of Examples 12-13 optionally include, wherein the heartbeat signal is provided by a device driver running on the host machine.

In Example 15, the subject matter of any one or more of Examples 1-14 optionally include, wherein the processor is to implement: a duplicate pathway management engine operative to cause the NID to establish at least one connection with at least one peer NID associated with a peer host machine, and to replicate the transaction-specific data to the at least one peer host machine, wherein the at least one peer host machine is operative to transmit the transaction-specific data utilizing the reliable message delivery protocol in response to the replication.

In Example 16, the subject matter of Example 15 optionally includes, wherein the NID is operative to transmit the transaction-specific data along a duplicate pathway as part of the reliable message delivery protocol.

In Example 17, the subject matter of any one or more of Examples 15-16 optionally include, wherein the NID is operative to transmit the transaction-specific data along a duplicate pathway only in response to a detected fault condition of the host machine.

In Example 18, the subject matter of any one or more of Examples 1-17 optionally include, wherein the processor is to implement: a transaction delivery assistance engine operative to receive a set of second transaction-specific data originated from a peer NID and to effect delivery of the set of second transaction-specific data according to the reliable message delivery protocol.

In Example 19, the subject matter of any one or more of Examples 1-18 optionally include, further comprising: a power source operative to supply power to the NID in an absence of power supplied by the host machine.

In Example 20, the subject matter of Example 19 optionally includes, further comprising: a power selector operative to detect a loss of power to the NID supplied by the host machine, and in response to the detection, to switch over to the power source.

In Example 21, the subject matter of any one or more of Examples 1-20 optionally include, wherein the processor is to perform encryption of the transaction-specific data prior to transmission of the transaction-specific data.

Example 22 is a method for operating a network interface device (NID) interfaced with a host machine, the method comprising: communicating with a local link of the host machine to obtain transaction-specific data relied upon by the host machine to be delivered to a destination by the NID according to a reliable message delivery protocol; and conducting communications over a network in response to obtaining of the transaction-specific data, the network communications including execution of the reliable message delivery protocol independent of any operability of the host machine.

In Example 23, the subject matter of Example 22 optionally includes, wherein the reliable message delivery protocol includes receipt verification messaging.

In Example 24, the subject matter of any one or more of Examples 22-23 optionally include, further comprising: logically mapping a memory of the NID to a set of memory addresses of the host machine to facilitate the host machine writing to the memory via a memory write operation.

In Example 25, the subject matter of any one or more of Examples 22-24 optionally include, wherein conducting the reliable communications is performed while the host machine is inoperative.

In Example 26, the subject matter of any one or more of Examples 22-25 optionally include, wherein conducting the reliable communications includes executing a communication and control protocol independently of any exchange of data with the host machine.

In Example 27, the subject matter of any one or more of Examples 22-26 optionally include, further comprising: detecting a start and an end of the transaction-specific data as indicated by the host machine.

In Example 28, the subject matter of any one or more of Examples 22-27 optionally include, further comprising: receiving an application programming interface (API) command from the host machine to indicate a transaction to be reliably communicated to a destination according to the reliable message delivery protocol.

In Example 29, the subject matter of any one or more of Examples 22-28 optionally include, further comprising: executing non-reliable data communications without message receipt verification independent of conducting the reliable communications.

In Example 30, the subject matter of any one or more of Examples 22-29 optionally include, further comprising: detecting an error in operability of the host machine, and in response adjusting execution of the reliable communications.

In Example 31, the subject matter of Example 30 optionally includes, wherein the adjusting execution of the reliable communications includes replicating the transaction-specific data to at least one peer NID.

In Example 32, the subject matter of any one or more of Examples 30-31 optionally include, further comprising: obtaining a heartbeat signal from the host machine and detecting a host machine failure in response to a disturbance of the heartbeat signal.

In Example 33, the subject matter of Example 32 optionally includes, wherein the heartbeat signal is provided by an application running on the host machine.

In Example 34, the subject matter of any one or more of Examples 32-33 optionally include, wherein the heartbeat signal is provided by a device driver running on the host machine.

In Example 35, the subject matter of any one or more of Examples 22-34 optionally include, further comprising: establishing at least one connection with at least one peer NID associated with a peer host machine; and replicating the transaction-specific data to the at least one peer host machine; wherein the at least one peer host machine is operative to reliably transmit the transaction-specific data according to the reliable message delivery protocol in response to the replication.

In Example 36, the subject matter of Example 35 optionally includes, further comprising: transmitting the transaction-specific data along a duplicate pathway as part of executing the reliable message delivery protocol.

In Example 37, the subject matter of any one or more of Examples 35-36 optionally include, further comprising: transmitting the transaction-specific data along a duplicate pathway only in response to a detected fault condition of the host machine.

In Example 38, the subject matter of any one or more of Examples 22-37 optionally include, further comprising: receiving a set of second transaction-specific data originated from a peer NID; and conducting reliable delivery of the set of second transaction-specific data according to the reliable message delivery protocol.

In Example 39, the subject matter of any one or more of Examples 22-38 optionally include, further comprising: operating a power source to supply power to the NID in an absence of power supplied by the host machine.

In Example 40, the subject matter of Example 39 optionally includes, further comprising: detecting a loss of power to the NID supplied by the host machine, and in response to the detection, switching over to the power source.

In Example 41, the subject matter of any one or more of Examples 22-40 optionally include, further comprising: performing encryption of the transaction-specific data prior to transmission of the transaction-specific data.

In Example 42, the subject matter of any one or more of Examples 22-41 optionally include, further comprising: storing transaction-specific data accessible to a plurality of NIDs in a shared memory space.

Example 43 is a network interface device (NID) interfaced with a host machine, the NID comprising: means for communicating with a local link of the host machine to obtain transaction-specific data relied upon by the host machine to be delivered to a destination by the NID according to a reliable message delivery protocol; and means for conducting communications over a network in response to obtaining of the transaction-specific data, the network communications including execution of the reliable message delivery protocol independent of any operability of the host machine.

In Example 44, the subject matter of Example 43 optionally includes, wherein the reliable message delivery protocol includes message receipt verification messaging.

In Example 45, the subject matter of any one or more of Examples 43-44 optionally include, further comprising: means for logically mapping a memory of the NID to a set of memory addresses of the host machine to facilitate the host machine writing to the memory via a memory write operation.

In Example 46, the subject matter of any one or more of Examples 43-45 optionally include, wherein the means for conducting the communications over the network conduct those communications while the host machine is inoperative.

In Example 47, the subject matter of any one or more of Examples 43-46 optionally include, wherein the means for conducting the communications over the network include means for executing a communication and control protocol independently of any exchange of data with the host machine.

In Example 48, the subject matter of any one or more of Examples 43-47 optionally include, further comprising: means for detecting a start and an end of the transaction-specific data as indicated by the host machine.

In Example 49, the subject matter of any one or more of Examples 43-48 optionally include, further comprising: means for receiving an application programming interface (API) command from the host machine to indicate a transaction to be reliably communicated to a destination according to the reliable message delivery protocol.

In Example 50, the subject matter of any one or more of Examples 43-49 optionally include, further comprising: means for executing non-reliable data communications without message receipt verification independent of conducting the reliable communications.

In Example 51, the subject matter of any one or more of Examples 43-50 optionally include, further comprising: means for detecting an error in operability of the host machine, and in response adjusting execution of the reliable communications.

In Example 52, the subject matter of Example 51 optionally includes, wherein the means for adjusting the reliable communications include means for replicating the transaction-specific data to at least one peer NID.

In Example 53, the subject matter of any one or more of Examples 51-52 optionally include, further comprising: means for obtaining a heartbeat signal from the host machine and means for detecting a host machine failure in response to a disturbance of the heartbeat signal.

In Example 54, the subject matter of Example 53 optionally includes, wherein the heartbeat signal is provided by an application running on the host machine.

In Example 55, the subject matter of any one or more of Examples 53-54 optionally include, wherein the heartbeat signal is provided by a device driver running on the host machine.

In Example 56, the subject matter of any one or more of Examples 43-55 optionally include, further comprising: means for establishing at least one connection with at least one peer NID associated with a peer host machine; and means for replicating the transaction-specific data to the at least one peer host machine; wherein the at least one peer host machine is operative to reliably transmit the transaction-specific data according to the reliable message delivery protocol in response to the replication.

In Example 57, the subject matter of Example 56 optionally includes, further comprising: means for transmitting the transaction-specific data along a duplicate pathway as part of conducting the reliable communication.

In Example 58, the subject matter of any one or more of Examples 56-57 optionally include, further comprising: means for transmitting the transaction-specific data along a duplicate pathway only in response to a detected fault condition of the host machine.

In Example 59, the subject matter of any one or more of Examples 43-58 optionally include, further comprising: means for receiving a set of second transaction-specific data originated from a peer NID; and means for conducting reliable delivery of the set of second transaction-specific data according to the reliable message delivery protocol.

In Example 60, the subject matter of any one or more of Examples 43-59 optionally include, further comprising: means for powering the NID in an absence of power supplied by the host machine.

In Example 61, the subject matter of Example 60 optionally includes, further comprising: means for detecting a loss of power to the NID supplied by the host machine, and in response to the detection, switching over to the power source.

In Example 62, the subject matter of any one or more of Examples 43-61 optionally include, further comprising: means for performing encryption of the transaction-specific data prior to transmission of the transaction-specific data.

In Example 63, the subject matter of any one or more of Examples 43-62 optionally include, further comprising: means for storing transaction-specific data accessible to a plurality of NIDs in a shared memory space.

Example 64 is at least one computer-readable medium containing instructions that, when executed on a processor of a network interface device (NID) interfaced with a host machine, cause the NID to perform: communicating with a local link of the host machine to obtain transaction-specific data relied upon by the host machine to be delivered to a destination by the NID according to a reliable message delivery protocol; and conducting communications over a network in response to obtaining of the transaction-specific data, the network communications including execution of the reliable message delivery protocol independent of any operability of the host machine.

In Example 65, the subject matter of Example 64 optionally includes, wherein the reliable message delivery protocol includes receipt verification messaging.

In Example 66, the subject matter of any one or more of Examples 64-65 optionally include, further comprising: instructions for causing the NID to logically map a memory of the NID to a set of memory addresses of the host machine to facilitate the host machine writing to the memory via a memory write operation.

In Example 67, the subject matter of any one or more of Examples 64-66 optionally include, wherein the instructions relating to conducting the communications cause the NID to conduct those communications while the host machine is inoperative.

In Example 68, the subject matter of any one or more of Examples 64-67 optionally include, wherein the instructions causing the NID to conduct the communications include instructions that, when executed, cause the NID to execute a communication and control protocol independently of any exchange of data with the host machine.

In Example 69, the subject matter of any one or more of Examples 64-68 optionally include, further comprising: instructions for causing the NID to detect a start and an end of the transaction-specific data as indicated by the host machine.

In Example 70, the subject matter of any one or more of Examples 64-69 optionally include, further comprising: instructions for causing the NID to perform receiving an application programming interface (API) command from the host machine to indicate a transaction to be reliably communicated to a destination according to the reliable message delivery protocol.

In Example 71, the subject matter of any one or more of Examples 64-70 optionally include, further comprising: instructions for causing the NID to execute non-reliable data communications without message receipt verification independent of conducting the reliable communications.

In Example 72, the subject matter of any one or more of Examples 64-71 optionally include, further comprising: instructions for causing the NID to perform detecting an error in operability of the host machine, and for adjusting the reliable communications in response to the error detection.

In Example 73, the subject matter of Example 72 optionally includes, wherein the instructions for causing the NID to perform adjusting of the reliable communications include instructions for causing the NID to perform replicating of the transaction-specific data to at least one peer NID.

In Example 74, the subject matter of any one or more of Examples 72-73 optionally include, further comprising: instructions for causing the NID to perform obtaining a heartbeat signal from the host machine and detecting a host machine failure in response to a disturbance of the heartbeat signal.

In Example 75, the subject matter of Example 74 optionally includes, wherein the heartbeat signal is provided by an application running on the host machine.

In Example 76, the subject matter of any one or more of Examples 74-75 optionally include, wherein the heartbeat signal is provided by a device driver running on the host machine.

In Example 77, the subject matter of any one or more of Examples 64-76 optionally include, further comprising: instructions for causing the NID to perform establishing at least one connection with at least one peer NID associated with a peer host machine; and instructions for causing the NID to perform replicating of the transaction-specific data to the at least one peer host machine; wherein the at least one peer host machine is operative to reliably transmit the transaction-specific data according to the reliable message delivery protocol in response to the replication.

In Example 78, the subject matter of Example 77 optionally includes, further comprising: instructions for causing the NID to perform transmitting of the transaction-specific data along a duplicate pathway as part of executing the reliable message delivery protocol.

In Example 79, the subject matter of any one or more of Examples 77-78 optionally include, further comprising: instructions for causing the NID to perform transmitting of the transaction-specific data along a duplicate pathway only in response to a detected fault condition of the host machine.

In Example 80, the subject matter of any one or more of Examples 64-79 optionally include, further comprising: instructions for causing the NID to perform receiving of a set of second transaction-specific data originated from a peer NID; and instructions for causing the NID to perform conducting reliable delivery of the set of second transaction-specific data according to the reliable message delivery protocol.

In Example 81, the subject matter of any one or more of Examples 64-80 optionally include, further comprising: instructions for causing the NID to supply its own power an absence of power supplied by the host machine.

In Example 82, the subject matter of Example 81 optionally includes, further comprising: instructions for causing the NID to perform detecting a loss of power to the NID supplied by the host machine, and in response to the detection, switching over to a NID-contained power source.

In Example 83, the subject matter of any one or more of Examples 64-82 optionally include, further comprising: instructions for causing the NID to perform encryption of the transaction-specific data prior to transmission of the transaction-specific data.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network interface device (NID), comprising:
   a local link interface circuit to interface with a local link of a host machine;
   a network interface circuit to transmit and receive data over a transmission medium that forms a portion of a computer network; and
   a processor to implement:
   a host interchange engine that obtains, via the local link interface circuit, transaction-specific data relied upon by the host machine to be delivered to a destination by the NID according to a reliable message delivery protocol; and
   a transaction delivery engine that conducts network communications via the network interface circuit in response to obtaining of the transaction-specific data, the network communications including execution of the reliable message delivery protocol independent of any operability of the host machine.

2. The NID of claim 1, further comprising a non-volatile memory that is accessible to memory addressing of the host machine, wherein the host machine is to write to the non-volatile memory via a memory write operation.

3. The NID of claim 1, wherein the transaction delivery engine is to cause the NID to broker reliable communications of the transaction-specific data while the host machine is inoperative.

4. The NID of claim 1, wherein the processor is to implement:
   a host failure detection and response engine that is to detect an error in operability of the host machine, and to adjust operability of the transaction delivery engine in response to the error detection.

5. The NID of claim 4, wherein the operability of the transaction delivery engine is adjusted to replicate the transaction-specific data to at least one peer NID.

6. The NID of claim 4, wherein the host failure and response engine includes a heartbeat monitor that is to obtain a heartbeat signal from the host machine and to indicate a host machine failure in response to a disturbance of the heartbeat signal.

7. The NID of claim 1, wherein the processor is to implement:
a duplicate pathway management engine operative to cause the NID to establish at least one connection with at least one peer NID associated with a peer host machine, and to replicate the transaction-specific data to the at least one peer host machine, wherein the at least one peer host machine is operative to transmit the transaction-specific data utilizing the reliable message delivery protocol in response to the replication.

8. The NID of claim 1, wherein the processor is to implement:
a transaction delivery assistance engine operative to receive a set of second transaction-specific data originated from a peer NID and to effect delivery of the set of second transaction-specific data according to the reliable message delivery protocol.

9. The NID of claim 1, further comprising:
a power source operative to supply power to the MD in an absence of power supplied by the host machine.

10. At least one non-transitory computer-readable medium containing instructions that, when executed on a processor of a network interface device (NID) interfaced with a host machine, cause the NID to perform:
communicating with a local link of the host machine to obtain transaction-specific data relied upon by the host machine to be delivered to a destination by the NID according to a reliable message delivery protocol; and
conducting communications over a network in response to obtaining of the transaction-specific data, the network communications including execution of the reliable message delivery protocol independent of any operability of the host machine.

11. The at least one computer readable medium of claim 10, wherein the reliable message delivery protocol includes receipt verification messaging.

12. The at least one computer-readable medium of claim 10, wherein the instructions for causing the NID to conduct the communications include instructions that, when executed, cause the NID to execute a communication and control protocol independently of any exchange of data with the host machine.

13. The at least one computer-readable medium of claim 10, further comprising:
instructions that, when executed, cause the NID to perform receiving an application programming interface (API) command from the host machine to indicate a transaction to be reliably communicated to a destination according to the reliable message delivery protocol.

14. The at least one computer-readable medium of claim 10, further comprising:
instructions for causing the NID to perform detecting an error in operability of the host machine, and for adjusting the reliable communications in response to the error detection.

15. The at least one computer-readable medium of claim 14, wherein the instructions for causing the NID to perform adjusting of the reliable communications include instructions for causing the NID to perform replicating of the transaction-specific data to at least one peer NID.

16. The at least one computer-readable medium of claim 14, further comprising:
instructions for causing the NID to perform obtaining a heartbeat signal from the host machine and detecting a host machine failure in response to a disturbance of the heartbeat signal.

17. The at least one computer-readable medium of claim 10, further comprising:
instructions for causing the NID to perform establishing at least one connection with at least one peer NID associated with a peer host machine; and
instructions for causing the NID to perform replicating of the transaction-specific data to the at least one peer host machine;
wherein the at least one peer host machine is operative to reliably transmit the transaction-specific data according to the reliable message delivery protocol in response to the replication.

18. The at least one computer-readable medium of claim 17, further comprising:
instructions for causing the NID to perform transmitting of the transaction-specific data along a duplicate pathway as part of executing the reliable message delivery protocol.

19. The at least one computer-readable medium of claim 10, further comprising:
instructions for causing the NID to perform receiving of a set of second transaction-specific data originated from a peer NID; and
instructions for causing the NID to perform conducting reliable delivery of the set of second transaction-specific data according to the reliable message delivery protocol.

20. A method for operating a network interface device (NID) interfaced with a host machine, the method comprising:
communicating, by the NID, with a local link of the host machine to obtain transaction-specific data relied upon by the host machine to be delivered to a destination by the NID according to a reliable message delivery protocol; and
conducting communications, by the NID, over a network in response to obtaining of the transaction-specific data, the network communications including execution of the reliable message delivery protocol independent of any operability of the host machine.

21. The method of claim 20, wherein conducting the reliable communications is performed while the host machine is inoperative.

22. The method of claim 20, further comprising:
receiving a set of second transaction-specific data originated from a peer NID; and
conducting reliable delivery of the set of second transaction-specific data according to the reliable message delivery protocol.

* * * * *

UNITED STATES PATENT AND TRADEMARK OFFICE
CERTIFICATE OF CORRECTION

PATENT NO. : 10,334,041 B2
APPLICATION NO. : 14/949265
DATED : June 25, 2019
INVENTOR(S) : Sukhomlinov et al.

Page 1 of 1

It is certified that error appears in the above-identified patent and that said Letters Patent is hereby corrected as shown below:

In the Claims

In Column 19, Line 27, in Claim 9, delete "MD" and insert --NID-- therefor

Signed and Sealed this
Fourteenth Day of April, 2020

Andrei Iancu
*Director of the United States Patent and Trademark Office*